Figure 1:
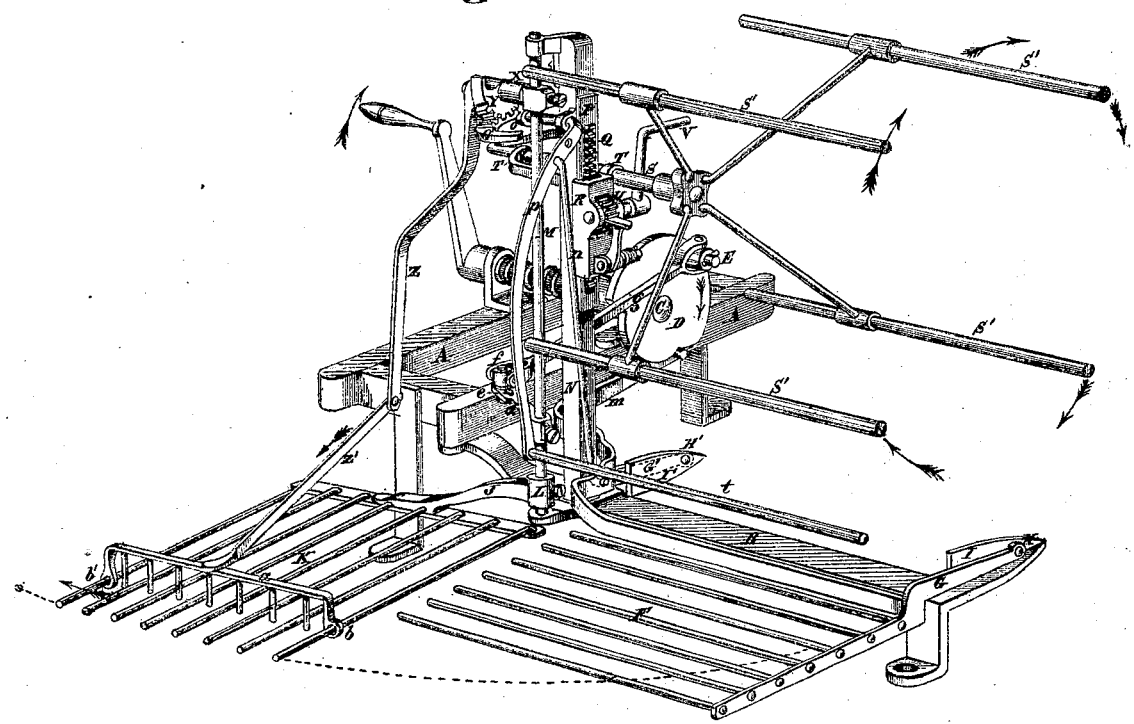

2 Sheets--Sheet 1.

N. ALLSTATTER & FRANK SCHURGER.
Improvement in Harvester Droppers.

No. 124,311. Patented March 5, 1872.

Attest.

Inventors.
Nicholas Allstatter
Frank Schurger
per Fisher & Fisher
Attys.

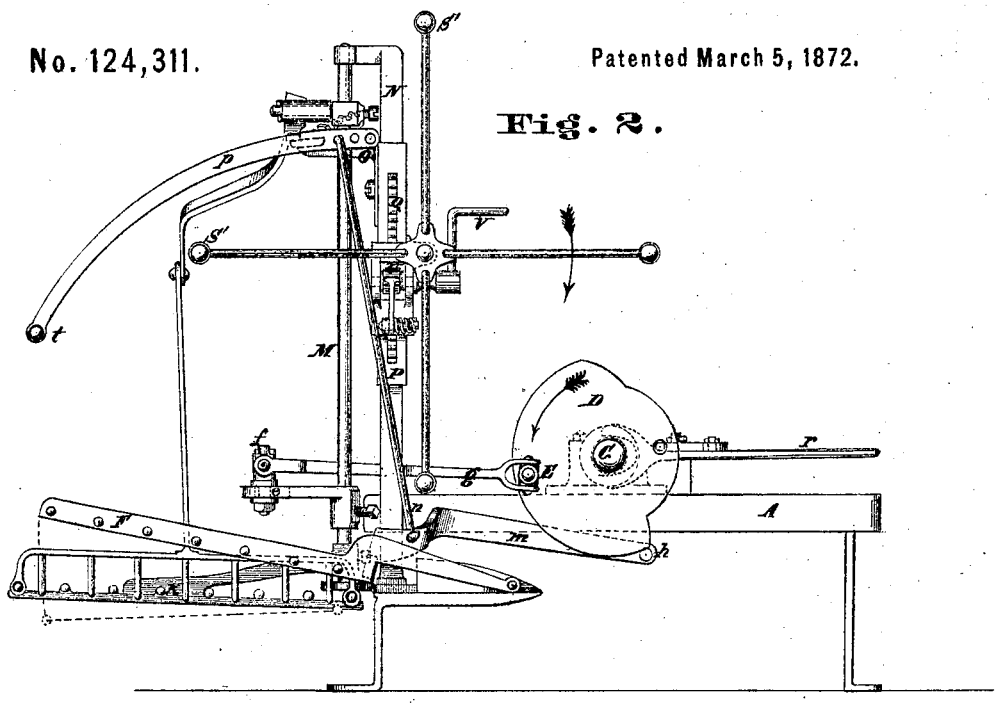
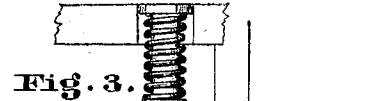
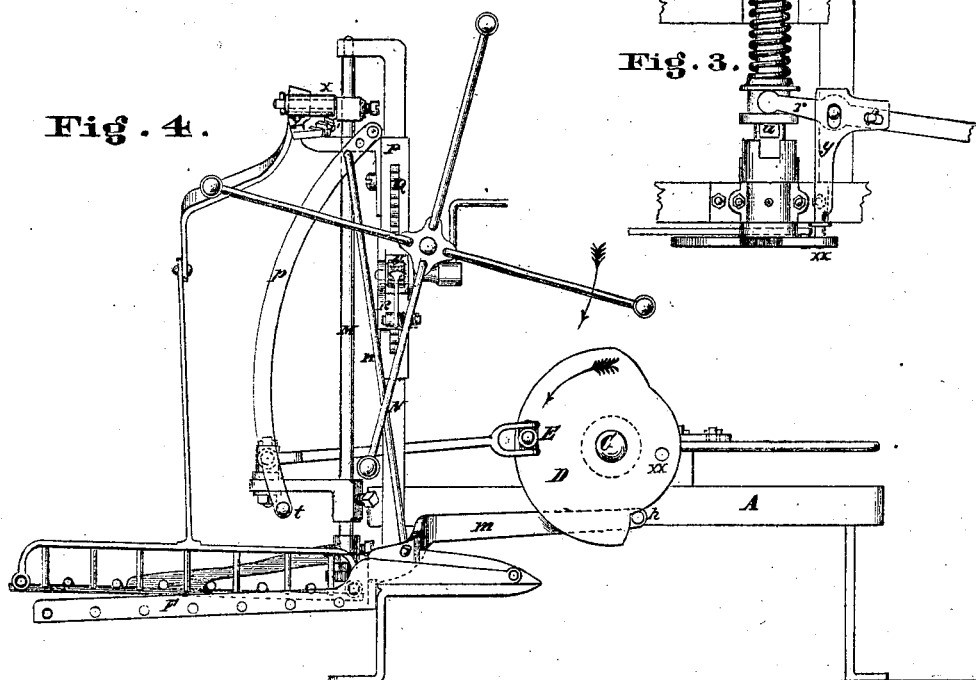

124,311

UNITED STATES PATENT OFFICE.

NICHOLAS ALLSTATTER AND FRANK SCHURGER, OF HAMILTON, OHIO, ASSIGNORS OF ONE-THIRD OF THEIR RIGHT TO ROBERT ALLSTATTER, OF SAME PLACE.

IMPROVEMENT IN HARVESTER-DROPPERS.

Specification forming part of Letters Patent No. 124,311, dated March 5, 1872.

We, NICHOLAS ALLSTATTER and FRANK SCHURGER, both of Hamilton, in the county of Butler and State of Ohio, have invented certain new and useful Improvements in Harvesters, of which the following is a specification:

Our inventions relate to the devices for operating the dropper-platform and rake in a more efficient manner.

In the accompanying drawing, Figure 1 is a perspective view of a portion of a harvester, showing our improvements. Fig. 2 is a side view of the same looking toward the main frame, and showing the stationary platform raised above the swinging platform. Fig. 4 is the same view of the machine, showing the stationary platform depressed below the swinging platform. Fig. 3 is a top view of the devices (shown in perspective in Fig. 1) for throwing the raking and dropping mechanism out of gear.

A represents the main frame of a harvester, the supporting wheel or wheels being removed. B is the cutter-bar; and C the main shaft or axle, upon the end of which is the cam-wheel D, carrying the crank-pin E. F is a platform, constructed of slats of wood or suitable material, provided with two arms, G G', hinged, respectively, to points H H'—the forward portion of the shoes I I. This enables the platform to rise and fall in the arc of a circle, the center of which is the axis passing through the points H H', the slats being at all times parallel with the cutter-bar. This platform, although it rises and falls, is called stationary to distinguish it from the swinging platform K, which is also slatted, and which is supported, near the middle of the bar which carries the slats, by an arm, J, secured, by a collar, L, and a set-screw, to the lower portion of the upright shaft M. This shaft revolves in suitable bearings in the top and bottom, so as to swing the platform away from and at right angles to the cutter-bar, or to bring the slats into parallelism with the slats of the platform F, and above or below them, as the latter may be raised or depressed. It is slightly inclined forward, so as to throw up the outer end of platform K a little as it swings back, to prevent the gavels of grain from being scattered until they are ready for delivery. This result is further secured by bending the slats upward slightly at their free extremities, being careful not to prevent them from passing freely under platform F. N is an upright reel-post, of wood or metal, the office of which is to support the reel and the quadrant-shaped plate O and ratchet O', for operating the rake. This post N rests upon and is attached to the bed-plate or shoe I. At its upper end it furnishes, by a projecting arm, a bearing for the shaft M. The reel is supported by the post in the following manner: Upon the side of the post toward the cutting apparatus a plate, P, is attached, carrying a toothed rack, Q. The plate I is somewhat wider than the post, so as to project beyond it on either side. The projecting edges may be either square or beveled. They afford guides for the sliding box R, which slips over them and is held by gibs. The box R carries, in suitable bearings T T', the reel-shaft S of the overhanging reel S' S' S' S', and it also affords support for bearings for the spur-pinion U, for raising and lowering the reel-shaft by means of the crank V. The reel can be held at any desired elevation by the spring-pawl W, or a set-screw, or other like device. Near the upper end of the reel-post is attached the quadrant-shaped plate O, which supports the rack O', which has a slight inclination or rise from the rear to the front end. An arm, X, is supported in bearings attached by collar and set-screw to the shaft M. This arm carries the eccentric beveled pinion Y, which engages with the rack O', and to its outer end is attached the swinging and jointed arm Z Z', which carries the rake a, and, by the movement of the arm, causes the rake to slide backward and forward upon the platform, the motion being regulated by two or more guides, b b'. Another arm, d, attached by a collar and set-screw near the lower end of the shaft M, projects toward the frame of the machine. This arm is slotted, at e, upon its outer end, and in this slot a stud-pin, f, is attached by a screw-nut, so as to be adjustable at any point, and thus regulate the extent of the horizontal movement of the platform K. Upon this stud-pin the end of the connecting-rod or pitman g works, while the other end is connected with the crank-pin E or cam-wheel D, by which it is operated. The periphery of the cam-wheel engages with a roller, h, upon the outer end of an arm, m, the inner end of which is attached to the platform F near the foot of the reel-post N, so that when the arm is raised or depressed by the cam D the rear end of the platform F will be correspondingly lowered or raised. At or near the point of attachment of arm m and platform F is pivoted a rod, n, the upper end of which is pivoted by adjustable holes to arm p, near the hinge or bearings of the latter. The arm p swings in bearings which are supported by the reel-post just above the quadrant-plate O, and from the lower end a cut-off or separating-rod, t, projects at right angles to arm p, and parallel to the cutter-bar. It is obvious that, when platform F is raised the rod n is also raised, thus causing the arm p to swing upward, and carry with it the separating-rod t, as shown in Fig. 2. There is a clutch-coupling, u, on the main shaft or axle C, operated by the forked lever r, which has its fulcrum upon the main frame. To this lever is connected the sliding bolt or stop y, Fig. 3, which fits into a hole, x x, Fig. 4, in the cam-wheel D. The raking mechanism can thus be thrown out of gear only at a single point—that is to say, when the platform F and cut-off t are raised, and the platform K is beneath and parallel with them.

The operation is as follows: When the machine is in the position shown in Fig. 1, the grain, as it is cut, falls against the cut-off or separating-rod t, by which it is supported until the cam D presses down the roller h upon the arm, and thus raises the platform F into the position shown in Fig. 2. At the same time the cut-off rod is withdrawn, and the grain falls on the platform F, where it remains until the shoulder of the cam passes the roller, so as to allow the latter to rise, when the platform F falls, the slats passing between those of the platform K, upon which the grain is thus delivered. At the same moment, the cut-off swings forward and separates the fallen from the falling grain, the platform K is swung around at right angles to the cutting apparatus, and parallel with the path of the machine, and the rake moves outward upon the slats and pushes the gavel backward upon the ground. By means of the inclined rack O' and eccentric pinion Y this movement of the rake increases in velocity as the rake approaches the outer end of the platform. If it is desired to secure a large gavel upon the platform F the lever r is operated so as to throw the mechanism out of gear. This can only be done at the instant that the bolt y is opposite the hole x x, or, in other words, when both platforms are behind and parallel with the cutter-bar, but just previous to the descent of the platform F and the cut-off t.

What we claim as new, and desire to secure by Letters Patent, is—

1. The swinging slatted platform K, in combination with the slatted platform F, when the latter is pivoted, substantially as shown, so as to rise and fall in the arc of a circle.

2. The combination of the swinging platform K and the rake a with the upright revolving shaft M.

3. The cut-off t, when combined with the hinged platform F and swinging platform K, all operating, in combination with each other, substantially as described.

4. The inclined rack O' and eccentric bevel-pinion Y, in combination with the rake a' and operating-arms.

5. The clutch-coupling u, combined with forked lever r, sliding stop y, and cam-wheel D, and hole x x.

NICHOLAS ALLSTATTER.
FRANK SCHURGER.

Witnesses:
S. SEEGMÜLLER,
CHAS. GREBNER.